United States Patent [19]
Bailey

[11] 3,794,332
[45] Feb. 26, 1974

[54] AUTOMATIC RECORD CHANGER

[75] Inventor: David C. Bailey, Occoquan, Va.

[73] Assignee: General Electric Company, Syracuse, N.Y.

[22] Filed: Dec. 28, 1971

[21] Appl. No.: 212,896

[52] U.S. Cl. .............................. 274/10 R, 274/23 R
[51] Int. Cl. .............................. G11b 15/00
[58] Field of Search .............................. 274/10 R, 23 R

[56] References Cited

UNITED STATES PATENTS

| | | | |
|---|---|---|---|
| 3,394,938 | 7/1968 | Reed et al. | 274/10 R |
| 2,614,847 | 10/1952 | Johnson | 274/10 R |
| 3,243,187 | 3/1966 | Caddy et al. | 274/10 R |
| 3,507,503 | 4/1970 | Freier | 274/10 R |
| 3,671,045 | 6/1972 | Bara | 274/10 R |
| 2,578,378 | 12/1951 | Stolberg | 274/10 R |
| 3,414,271 | 12/1968 | Eisemann | 274/23 R |
| 3,460,840 | 8/1969 | Koepke | 274/10 R |

*Primary Examiner*—Harry N. Haroian
*Attorney, Agent, or Firm*—Marvin A. Goldenberg; W. J. Shanley, Jr.; Frank L. Neuhauser

[57] ABSTRACT

An automatic record changer, including a velocity tripping mechanism for initiating a record-changing cycle, is provided with a disabler which prevents operation of the velocity tripping mechanism responsive to the positioning of a control handle carried by the changer. A tone arm positioning mechanism is provided which positions the tone arm for the playing of records of various sizes responsive to the setting of a control knob carried by the changer. A cueing mechanism, which functions independently of the tone arm positioning mechanism, may be operated by an operator to raise the tone arm from a record and return it thereto after the tone arm position has been manually laterally adjusted by the operator. In conjunction with the tone arm positioning and cueing mechanism, there is provided a clutch for resisting undesirable lateral tone arm motion whenever the tone arm is displaced from the turntable. An automatic shutoff mechanism, responsive to the position of the balance arm after play of the last record is provided to cease operation of the record changer upon completion of the last record.

22 Claims, 17 Drawing Figures

PATENTED FEB 26 1974

3,794,332

SHEET 2 OF 8

AUTOMATIC RECORD CHANGER

BACKGROUND OF THE INVENTION

The present invention relates to automatic record changers.

The trend of modern day automatic phonographic equipment is toward the inclusion of more and more automatic functions to be conducted by the apparatus. It has been the previous practice to add various mechanisms to earlier changers in order to accomplish new functions. A consequent problem of this trend is that automatic record changers are becoming extremely complex and require a multiplicity of moving parts to accomplish their various automatic functions. This has created a situation where the basic record changer is becoming increasingly expensive. Efforts have been made to reduce the cost of such record changers by reducing materials and machining costs. As a result, these automatic record changers have become unsatisfactory due to the characteristic unreliability of inexpensive but complex machinery.

The seemingly incompatible objectives of increasing the reliability of operation while reducing the cost of construction of fully automatic record changers are achieved by the present invention wherein the elements controlling several of the automatic functions of the record changer have been integrated into simplified and less expensive combinations.

It is therefore an object of the present invention to provide a record changer having improved reliability.

It is another object of this invention to provide a record changer having reduced cost of production.

It is further object of this invention to provide a record changer incorporating several automatic functions into simplified cooperating mechanisms.

Many present day record changing apparatus incorporate elements to perform the tone arm positioning function which elements move the tone arm laterally with respect to the turntable while maintaining a positive locking engagement with the tone arm. Consequently, any accidental movement of the tone arm in the lateral direction during the positioning thereof results in possible damage to the positioning elements. Furthermore, the automatic positioning elements commonly have no provision for resisting motion of the tone arm in the lateral direction during the time between the positioning of the tone arm and the lowering of the tone arm onto the turntable. During this time it is possible that external forces or the momentum of the tone arm itself could tend to move the tone arm laterally beyond the desired position and possibly damage the record or stylus upon lowering.

It is therefore an object of this invention to provide an atuomatic record changer having improved and simplified tone arm positioning apparatus for disposing the tone arm at a lateral position appropriate for the playing of records of various sizes, responsive to a setting made by the operator.

It is another object of this invention to provide automatic tone arm positioning elements which engage the tone arm in a manner so that external forces tending to move the tone arm in a lateral direction will not do damage to the positioning mechanism.

It is another object of this invention to provide a mechanism which resists undesired lateral motion of the tone arm during the time between the final positioning thereof, and the time at which the stylus engages a record on the turntable.

In moderm phonographic apparatus which incorporate cueing mechanisms, it is common that, when the tone arm is lifted by such mechanism, it is unrestricted in lateral movement, and undesired lateral motion is possible. This unrestrained cueing of the tone arm makes it quite difficult to effectuate precise manual return of the tone arm to the record.

It is therefore a further object of this invention to provide a record changing apparatus incorporating a cueing mechanism for raising and lowering the tone arm, which includes means for resisting lateral motion of the tone arm while the tone arm is displaced from the record.

It is another object of the present invention to release the tone arm from resistance to lateral motion upon return of the tone arm to the record.

It is another object of the present invention to provide a record changer incorporating a cueing mechanism for raising and lowering the tone arm responsive to actuation by an operator for allowing lateral motion of the tone arm manually by the operator without danger of damaging the record or stylus due to unintended lateral movement of the tone arm during setdown of the tone arm.

In record changers which incorporate a shutoff mechanism responsive to the position of the balance arm after the dropping of the last record onto the turntable, it is common that undesirable noises and movement are occasioned by the balance arm member and attendant shutoff elements operating when the tone arm stylus is engaged in the play of the last record. The noises are occasionally amplified to be reproduced by the speaker and the movement is capable of causing the tone arm to skip.

It is therefore a further object of the invention to provide improved means for automatically ceasing operation of the record changer which is activated by the position of the balance arm only after the last record has been played.

It is a still further object of this invention to provide an automatic record changer having a shutoff function responsive to balance arm position after the last record has been played which accomplishes an adjustment of the shutoff elements relative to the balance arm during the time when the tone arm stylus is disengaged from a record on the turntable.

Prior art record changers have used velocity trip mechanisms to initiate record-change cycles and have made provisions for disabling the trip mechanism during "manual play" modes of operation. Commonly, these disablers have required the addition of a plurality of elements to the record changer. For purposes of economy, it is desirable to incorporate a disabler not requiring added elements. Additionally, it is desirable that the disabler be capable of preventing velocity trip actuation while the changer is in a de-energized condition in order to preclude damage to the apparatus during shipping or upon startup while some elements are restrained, as for example by adhesive shipping tape.

It is therefore a further object of this invention to provide a record changer having an improved velocity tripping mechanism for initiating a record-change cycle and providing a "manual play" function wherein the velocity tripping mechanism is disabled.

It is a further object of the present invention to accomplish disabling of the velocity tripping mechanism by means of a simple member, integrated with elements already provided for other functions.

It is another object of this invention to provide a velocity trip disabler which is effective to prevent actuation of the velocity tripping mechanism when the apparatus is in a de-energized condition as well as in a "manual play" condition.

The organization and method of operation of the present invention, together with further objects and advantages thereof, will be better understood by reference to the following specification taken in conjunction with the accompanying drawings in which:

FIG. 1 is a perspective view of the record changer of the present invention.

FIG. 1*a* is a fragmentary perspective view of a portion of the record changer disclosing the function selector handle.

DETAILED DESCRIPTION

Figures 1, 1A:
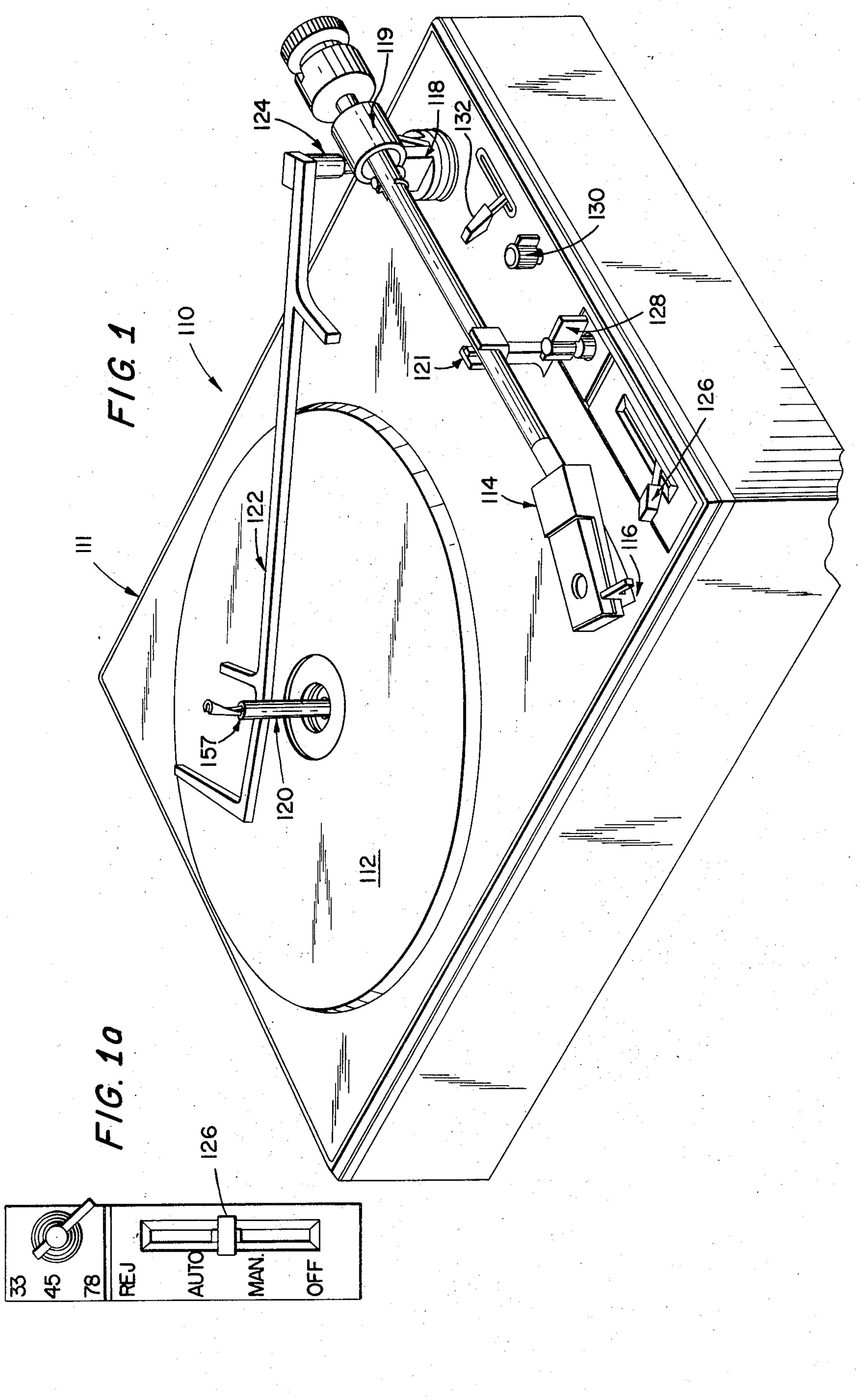

Referring now to the drawings, the record changer of the present invention is more particularly disclosed.

FIG. 1 shows a record changer generally designated 110, which includes a baseplate 111 and a turntable 112 rotatably mounted thereon. A tone arm 114 having a stylus 116 for engaging records is carried by the baseplate and supported by means of tone arm shaft 118. The tone arm is arranged so as to be movable laterally relative to the turntable 112 as well as displaceable perpendicularly relative thereto by the combined means of the rotatable character of the tone arm shaft 118 and a pivotable junction at collar 119. A tone arm support post 121 is provided for retaining the tone arm when the record changer is not in use.

A central aperture in the turntable is penetrated by a spindle 120 for supporting a number of records to be successively dropped onto the turntable. A balance arm 122 is provided for overlying and retaining the plurality of records held by the spindle. Balance arm support shaft 124 is axially slideable with respect to the baseplate and rotatable to allow the balance arm to be raised and rotated to a position remote from the turntable and spindle for allowing access to the spindle for the addition or removal of records.

In accordance with one aim of the present invention, numerous automatic controls for self-effectuating functions of the record changer are provided on the face of the base-plate. A function selector handle 126, positionable in alternative "off," "manual play," "automatic play," and "reject" positions (shown in FIG. 1*a*) for controlling the modes of operation of the record changer is provided, the operation of which will become evident hereinafter. A speed selector handle and shaft 128 is provided for adjusting the drive of the turntable to any of a number of alternative rotational velocities. A record size selector handle 130, in combination with other elements which will be described hereinafter, controls the positioning mechanism for locating the tone arm for the playing of records of various diameters. A cueing handle 132 controls members, which will be described hereinafter, for allowing an operator to manually raise and lower the tone arm and retain the tone arm in a position displaced from the turntable for manual movement thereof laterally with respect to the turntable independently of the automatic size selection and tone arm positioning mechanisms.

Figure 2:
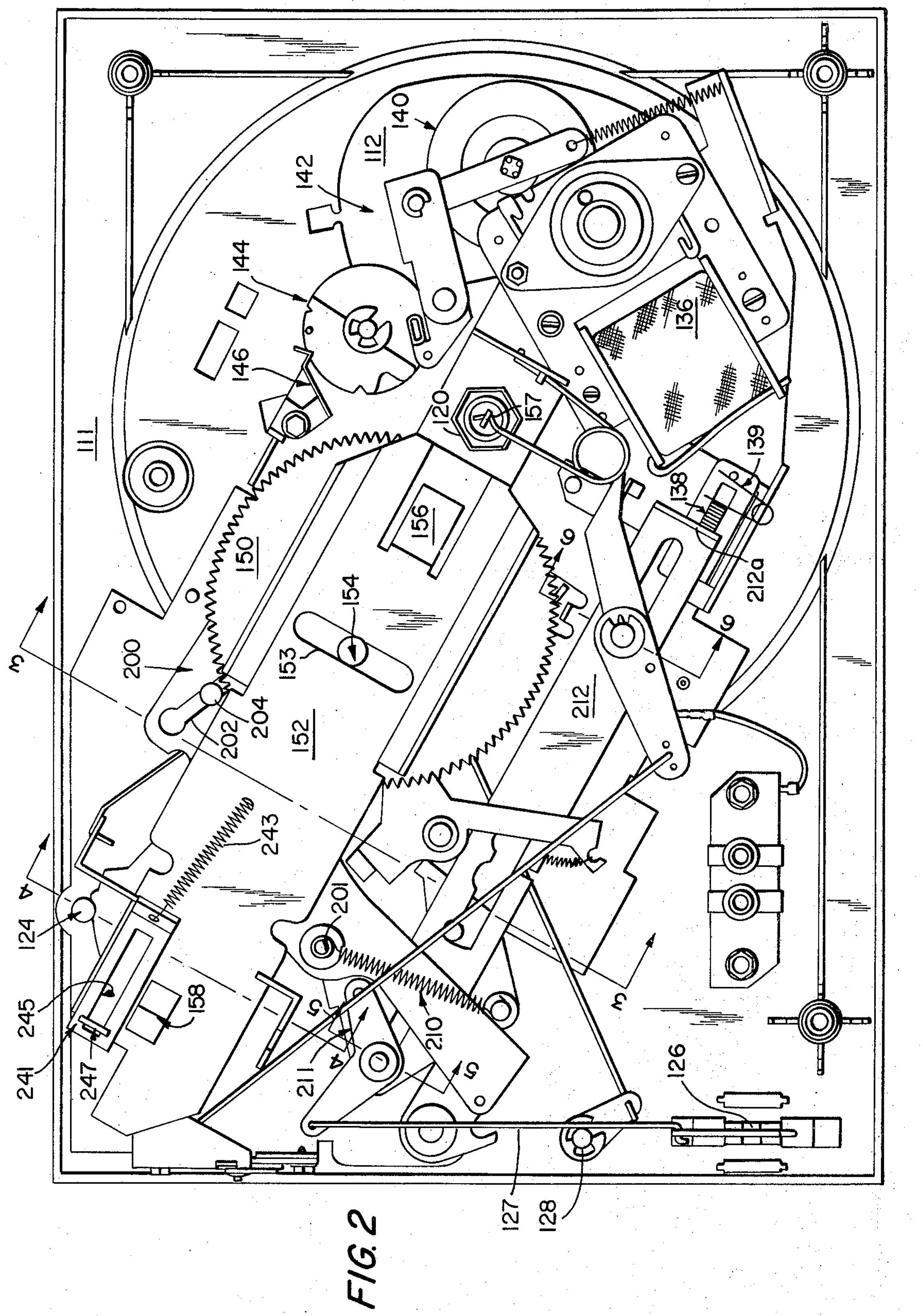
FIG. 2 is a plan view of the underside of the record changer of the present invention.
Figure 3:
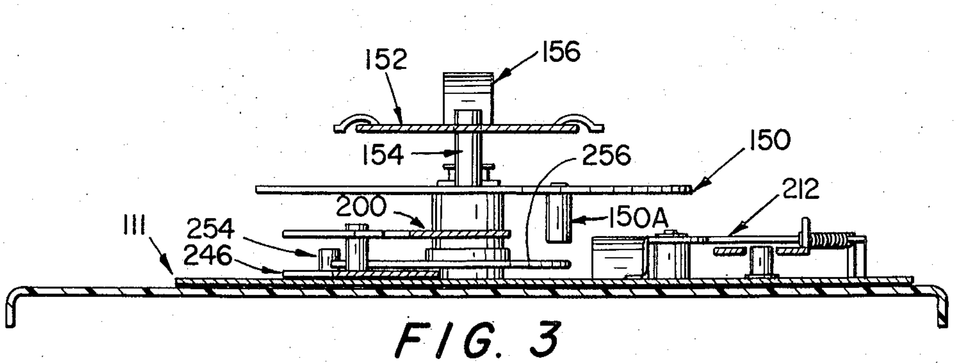
FIG. 3 is a section view taken along line 3—3 of FIG. 2.

FIG. 2 discloses a plan view of the operating mechanisms of the record changer of the present invention. Baseplate 111 is shown from the underside as is turntable 112 and spindle 120. A motor 136 is provided for driving the turntable through idler wheel 140. The motor is controlled by a switch 138 which is biased to the energized "on" condition. The driving of the turntable is accomplished by means of a variable speed arrangement wherein idler 140 cooperates with a stepped shaft (not shown) of the motor. Variation of the speed of the turntable is controlled by the combined action of the movable idler support linkage 142 and an associated cam follower in conjunction with cam 144. A linkage 146 between cam 144 and speed selector handle shaft 128 determines the position of the cam and consequently the position of the idler wheel in mutual tangency with the turntable 112 and one of the steps of the stepped motor shaft. The operation of the speed changing apparatus is well known in the art, and is not of independent significance with respect to the present invention, and therefore is not described in greater detail.

FIG. 2 shows the four main elements of the changer mechanism in sufficient detail to obtain a general understanding of the basic operation of the changer. Detailed description of the unique features of the changer will follow below. FIG. 2 shows cycle gear 150, main slide 152, function cam 200 (shown in greater particularity in FIG. 12) and function slide 212. Cycle gear 150 controls all of the automatic functions involved in the change of a record. By means of eccentric pin 154 in main slide slot 153, cycle gear 150 during its single record change revolution drives the main slide initially to the right causing the tone arm to be lifted and pivoted away from the spindle to permit drop of the record.

After the cycle gear has moved the main slide inward to lift the tone arm and move it clear of the record to be dropped, continued movement of the cycle gear moves the main slide further to the right to bring the main slide into engagement with knife 157 contained within spindle 120 to eject the lowermost record contained in the stack on spindle 120. Subsequent movement of the cycle gear moves the main slide to the left to free the tone arm and causes positioning plate 246 (FIG. 14) to engage the tone arm mechanism to bring the tone arm into the setdown position for the start of record play.

The cycle gear also in the first half of its cycle drives function cam 200 about its pivot 201 to permit communication between the function cam and the balance arm shaft 124 to determine from the vertical position of the balance arm shaft if the changer has played the last record and should be shut off. If the function cam is directed to the shutoff position by the balance arm shaft the function cam will cause proper alignment of shutoff members so that pin 150*a* (FIG. 12) on the cycle gear will engage these members causing the spring biased function slide 212 to be released to move power switch 138 to the off position. If the function cam is not directed to the shutoff position it will return to its normal position where it determines the setdown position of the tone arm.

Function slide 212 has four positions controlled directly by function selector handle 126, "OFF," "MANUAL PLAY," "AUTOMATIC" and "REJECT." This slide dictates the mode of operation of the record changer mechanism.

RECORD DROP

The mechanism for releasing individual records onto the turntable from the plurality of records held above the turntable by the spindle operates in a well known manner and is therefore not disclosed with great particularity.

FIG. 1 shows spindle 120 having a knife 157 extending axially therewith. FIG. 2 shows the lower end of spindle 120 and of knife 157. The knife is spring biased and pivoted for motion transverse the axis of the spindle, the bias holding the knife in a position wherein its upper portion protrudes radially from the spindle to fit within the hole of the lowermost record maintained on the spindle shelf 159. During each record change cycle of the automatic changer of the present invention, cycle gear 150 makes a single revolution as previously described. An eccentric pin 154 on cycle gear 150 makes an orbit during the revolution of the cycle gear and drives main slide 152 in a single reciprocation by means of cooperation with slot 153 in the slide. A tab 156 disposed on the main slide at the end near the spindle is positioned to engage the lower end of knife 157 when the reciprocation of the slide has brought the tab 156 into position for this engagement. The knife is driven against its normal bias, and its upper end is withdrawn from radial protrusion from spindle 120, whereby the lowermost record from the plurality held upon the spindle is moved off shelf 159 to be dropped onto the turntable 112. This process of dropping records into playing position on the turntable is repeated each time rotation of the cycle gear is conducted.

CYCLE INITIATION

Figures 14, 15:
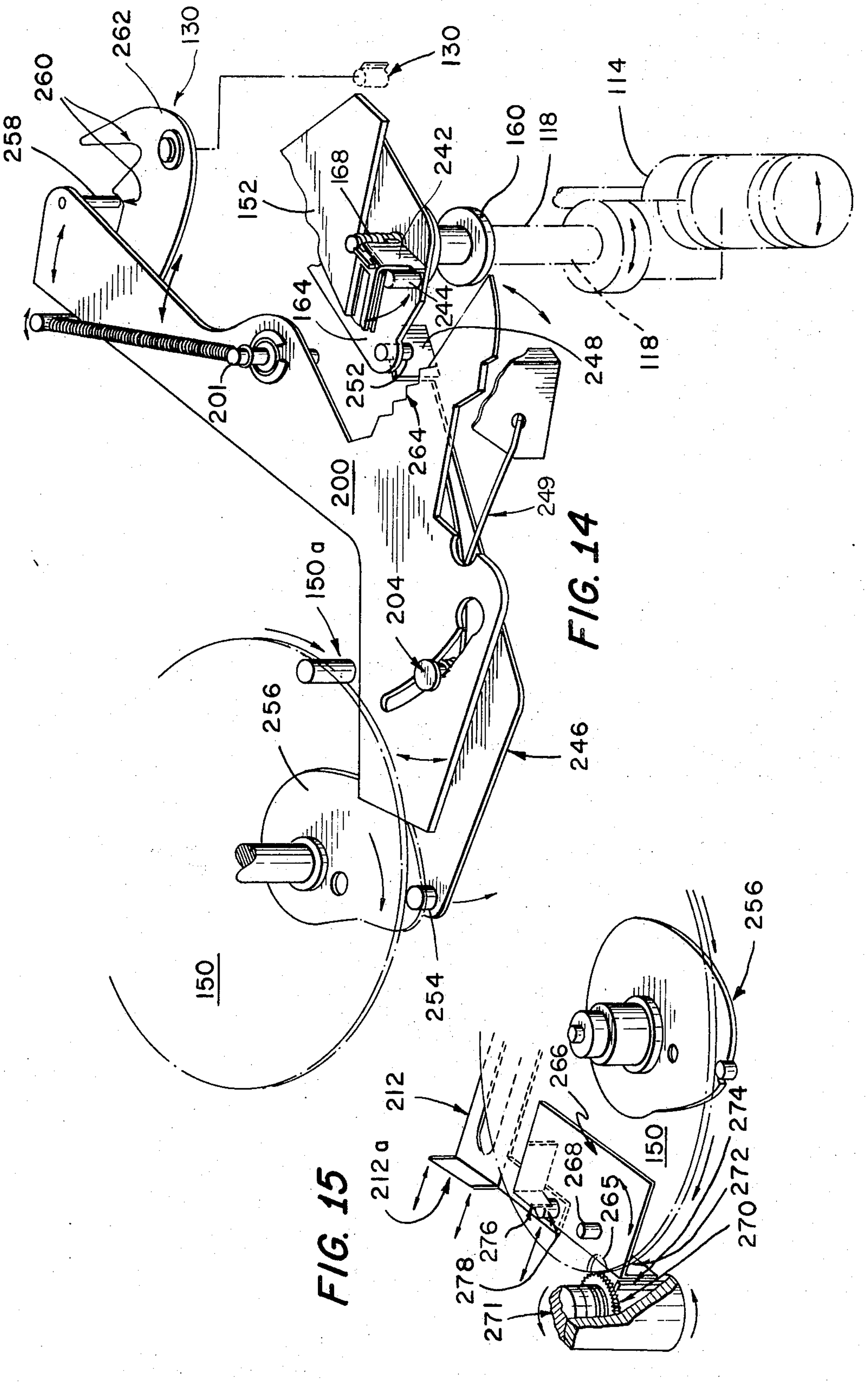
FIG. 14 is a perspective view of elements related to the automatic tone arm positioning function.
FIG. 15 is a partial perspective view of elements related to record-change cycle initiation.
Figure 16:
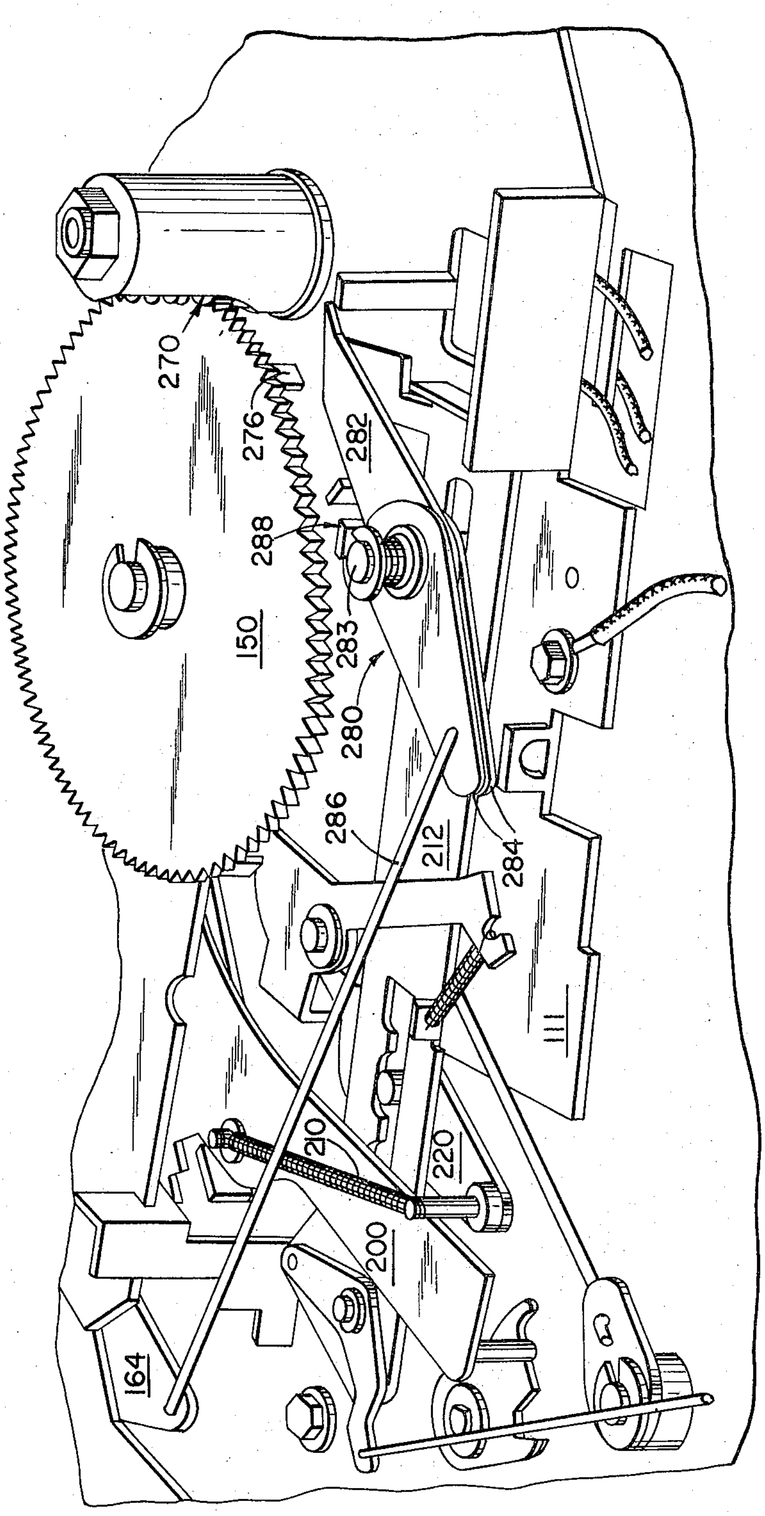
FIG. 16 is a perspective view of elements related to record-change cycle initiation and to the "manual play" mode of operation.

A first means for cycle initiation is disclosed in FIG. 2 and in greater detail in FIGS. 15 and 16 which show cycle gear 150 positioned and adapted to be engaged by a pinion 270 carried by turntable shaft 271 which surrounds the spindle 120. While the changer is energized, the turntable, and consequently pinion 270, are in constant rotation. Cycle gear 150, however, has a mutilated portion 265 (bearing no teeth) which is normally disposed adjacent pinion 270 for preventing cycle gear engagement therewith as the tone arm advances across a record on the turntable.

A pawl 266 is shown (FIG. 15) pivotally mounted upon gear 150 by means of pin 268. Pawl 266 carries a first tab 272 which is adapted to be engaged by a striker 274 carried by the rotating turntable shaft 271 when the pawl is pivoted into a proper orientation by elements described below. Upon engagement of tab 272 by the striker, the cycle gear is advanced sufficiently that the mutilated portion 265 is rotated out of proximity with the pinion 270, and the teeth of the cycle gear are engaged by the pinion.

Pawl 266 may be brought into contact with striker 274 either manually to initiate cycle change by movement of function handle 126 (FIG. 1*a*) to the reject position, or automatically by the velocity trip mechanism, described below. For manual cycle change function selector handle 126 is moved to the reject position to move function slide 212 to the left-most position by means of control rod 127 and bell crank 211. This movement brings upstanding lug 278 (FIG. 15) of function slide 212 into engagement with a second tab 276 on pawl 266 to pivot the pawl into contact with striker 274. In this way, a record-change cycle may be initiated by the operator at any point in the operation of the record changer.

A second means for initiating a record-change cycle involves a velocity trip mechanism. This velocity trip mechanism functions similarly to those common in the prior art, and therefore is not discussed with great particularity, FIG. 16 shows a velocity trip mechanism generally designated 280 including an arm 282 pivoted about post 283 and adapted to engage tab 276 of the pawl 266. A pair of arms 284 sandwich arm 282 therebetween in a frictional engagement, arms 284 likewise being pivoted about post 283. A rod 286 extends between arms 284 and tone arm plate 164 affixed to the tone arm shaft 118 (see FIG. 7). Rod 286 transmits the motion of the tone arm through tone arm plate 164 to arms 284, whereby arm 282 is advanced against the tab 276. Since during the playing of a record the distance moved by the tone arm in one revolution of the turntable is short, the pawl movement is slight and tab 276 is pushed back against arm 282 by the impact of the striker 274 upon tab 272 of pawl 266 (FIG. 15). The arm 282 is thus forced to move against the frictional engagement with arms 284 in a lost motion fashion.

When the tone arm reaches the "lead out groove" (wherein the tone arm is advanced a substantially greater distance in a single revolution of the turntable than during the playing portion of the record) the motion of the tone arm is transmitted to arm 282 which pivots pawl 266 sufficiently to be engaged rather than rebuffed by striker 274. In this manner, the cycle gear 150 is moved into mesh with the teeth of pinion 270 automatically upon the completion of the playing of a record on the turntable.

In the foregoing fashion, the record changer of the present invention accomplishes initiation of the record-change cycle in either of two ways — manually, by means of motion of the slide 212 into its reject position, or automatically, by means of the actuation of the velocity trip mechanism 280.

FUNCTIONAL CONTROL

Figure 13:
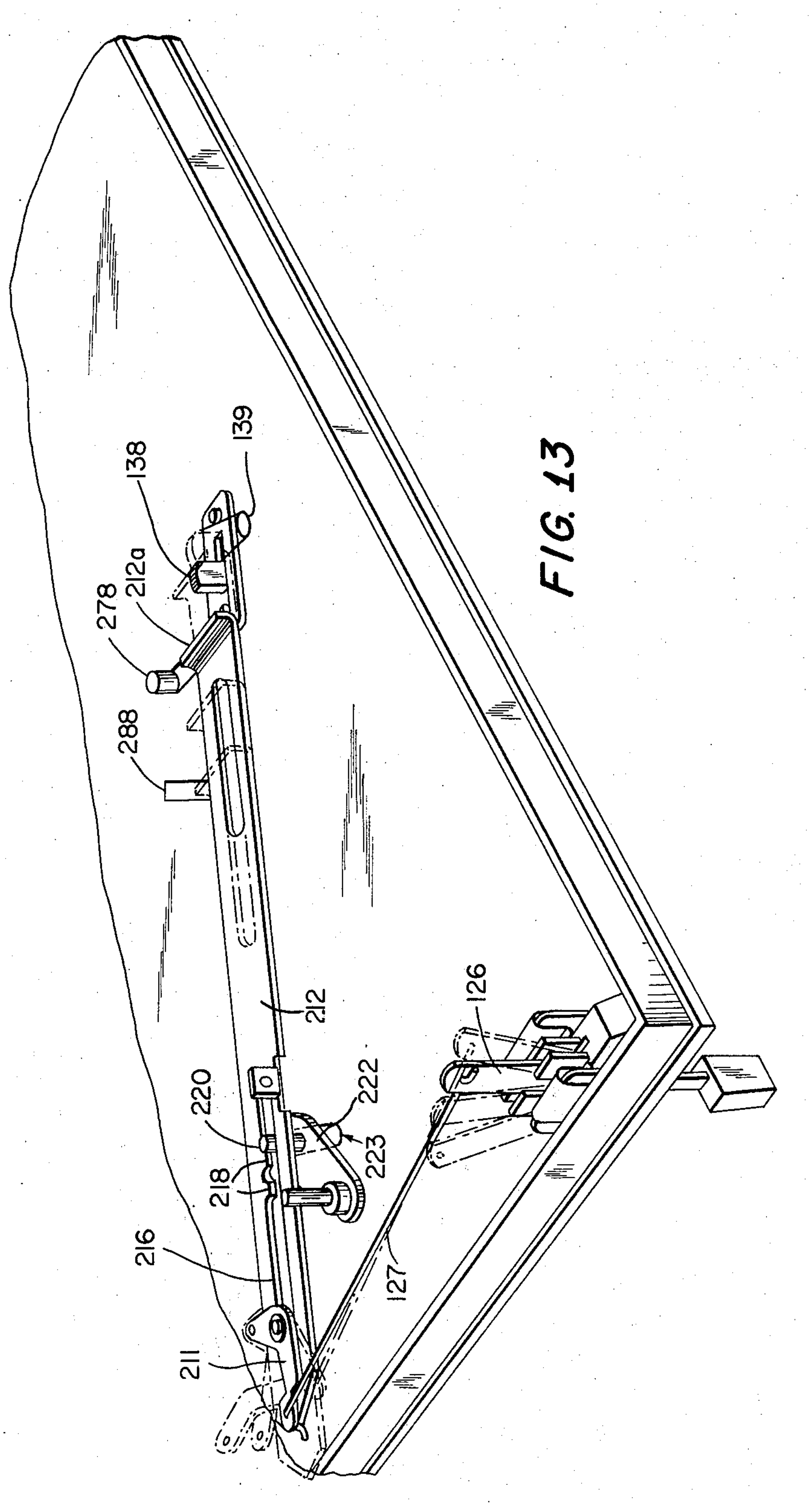
FIG. 13 is a perspective view of elements and movements thereof related to the selection of modes of operation of the record changer.

FIG. 13 shows four alternative positions for function slide 212 including "off," "manual play," "automatic play" and "reject." Each of these positions corresponds to a similarly designated position of the function selector handle 126 shown in FIG. 1a. The function represented by each is as follows:

"Off designates a condition in which the changer is completely at rest and the motor de-energized. This is the position the furthest to the right in FIG. 13 in which tab 212*a* is in engagement with switch 138 to hold it in the right-hand "off" position.

"Manual play" designates a condition in which the motor is energized, the turntable is driven and a record thereon is playable. However, no record-change cycle will occur upon completion of the playing of a record, because the cycle initiating means is "disabled" as will be described. The "manual play" a position in the second position from the right of the function slide.

"Automatic play" condition corresponds to the energization of all automatic functions, initiated upon the occurrence of a record change cycle. The position of the function slide is second from the left.

"Reject" is the designation of the manual initiation of a record-change cycle and is brought about by movement of the function slide to the left-most position as is described below.

The position of slide 212 may be determined by the cooperation therewith of a bellcrank linkage 211 (in FIG. 2), and a control rod 127 connected to function selector handle 126. Thus, pivoting of handle 126 drives slide 212 between the aforementioned positions. Slide motion is restricted by restraining pin 220 on catch plate 222 and the bias of spring 210 (FIG. 2) holding restraining pin 220 against slide teeth 218. Sufficient force applied to handle 126 will cause teeth 218 to cam restraining pin 220 out into slot 216 to permit the slide 212 to move. In this way, the slide can be moved to any position independently of the mode of operation of the changer at that given instant. For example, even while the changer is conducting a record-change cycle, the motor may be de-energized by motion of the handle to the "off" position. This is a definite advantage of the mechanism of the present invention, inasmuch as any malfunction which may occur during a change cycle can be immediately terminated by moving the handle to the "off" position.

MANUAL PLAY

It is sometimes desired to operate automatic record changers without the automatic initiation of the record-change cycle. For this to be possible, it is necessary to provide for means to disable the automatic cycle initiation means, the velocity trip mechanism. In the spirit of the present invention, this has been accomplished in an extremely simple manner utilizing elements provided for other functions.

Referring to FIGS. 13 and 16, slide 212 is shown to incorporate a lug 288 which extends from the slide in such a fashion that, when the slide is moved into the "manual play" position, lug 288 is positioned in the path of motion of velocity trip arm 282. As the tone arm progresses across a record on the turntable, the movement transmitted through rod 286 and arms 284 is not passed to arm 282, since the arm 282 is restrained by the lug 288. As a result, the velocity trip mechanism is disabled, and the record-change cycle will not be initiated upon completion of the record on the turntable since arm 282 is unable to pivot tab 276 and pawl plate 266 into engagement with striker 274 (FIG. 15). Hence, the automatic record changer of the present invention has accomplished in a very simple and inexpensive, as well as reliable manner the disabling of the velocity trip mechanism for providing a manual play mode of operation.

A further problem which has arisen in prior art automatic record changers is that when the changer is removed from a power source and transported to another location, automatic record-change cycle initiating mechanisms have become engaged. This results in initiation of a record-change cycle immediately upon attachment of the record changer to another power source. If, during transportation, the tone arm for example has been taped down upon its supporting post, the initiation of the record-change cycle with the arm so restricted could cause damage to the motor or other operating elements of the changer.

The record changer of the present invention has solved this problem in an extremely simple and inexpensive fashion. The same lug 288 which disables the velocity trip mechanism 280 when the changer is in the manual play mode, also disables the velocity trip mechanism when the changer is de-energized. As described above, slide 212 is brought to the "off" position which, as shown in FIG. 13, is to the right of the manual play position. Thus, lug 288 is disposed further into the path of movement of arm 282 toward pawl 266 and precludes engagement of arm 282 with the pawl 266.

TONE ARM POSITIONING

Referring now to FIG. 14, the mechanism for automatically positioning the tone arm in accordance with the size of the records to be played is disclosed. Tone arm 114 and tone arm shaft 118 are shown, along with record size selector handle 130, by which the size of the records to be played is indicated to the mechanism.

Tone arm lift pin 168, slideably mounted in tone arm shaft 118, is in its lowered position due to the presence of a detent 158 in main slide 152 adjacent lift pin 168 during the playing of a record on the turntable. Upon initiation of the record-change cycle, and rotation of the cycle gear, the main slide 152 is reciprocated by pin 154 (shown in FIG. 2) as discussed above, with the effect that lift pin 168 leaves detent 158 and is driven into lifting engagement with the tone arm, whereby the tone arm is lifted from the record surface. At this time, the clutch mechanism, shown in FIGS. 4 and 7, comprising flange 162 fixed to the base plate 111, tone arm plate 164 rotatable with tone arm shaft 118, and friction washer 166, is actuated by the compression of spring 170 on lift pin 168. The clutch mechanism supplies drag force against undesired lateral movement of the tone arm by placing a restraining force on tone arm plate 164 by means of friction washer 166 being pressed between fixed flange 162 and the tone arm plate 164 to retard rotation thereof and consequently to retard rotation of the tone arm shaft 118 to which the tone arm plate is fixed.

Having been raised from the record, the tone arm is rotated outwardly away from the record to be played by the main slide as it continues toward the center spindle. This outward movement of the tone arm is effectuated by tab 242 carried by jam-resistant slide 241 (FIG. 2) which is resiliently secured to main slide 152 by spring 243 and by main slide notched tab 247 in slot 245 of slide 241. Tab 242, as shown in FIG. 14, engages a first pin 244 carried by tone arm plate 164. Movement of the slide causes rotation of tone arm plate 164 and consequently rotation of the tone arm shaft 118 to which it is attached. In this way the tone arm is rotated outwardly from the turntable in order to clear the way for the dropping of a record from the spindle to the turntable.

According to one object of the present invention, during this outward rotation of the tone arm, in addition to engagement by the clutch mechanism the tone arm is engaged only by tab 242 of jam-resistant slide 241. Since jam-resistant slide 241 is resiliently secured to the main slide by spring 243, any accidental interference with the tone arm during its outward movement will cause jam-resistant slide 241 to slide with respect to main slide 152 against the bias of spring 243 preventing damage to the mechanism.

When the main slide has reached its innermost position and engages knife 157 in spindle 120 to eject the next record, it then begins to move outwardly under the influence of cycle gear pin 154 so that the tone arm is freed from contact with the main slide and will come under the influence of other elements controlling its return. These elements include an upstanding tab 248 carried by positioning plate 246 pivotally mounted to the baseplate by means of pin 204. Tab 248 is adapted to engage a second pin 252 carried by tone arm plate 164, whereby movement of the tab against the pin induces inward rotation to the tone arm toward the turntable. The movement of positioning plate 246 is controlled by the cooperation between a cam follower pin 254 carried by the positioning plate and cam 256 carried by the cycle gear. Positioning plate 246 is biased into engagement with cam 256 by spring 249. The cam 256 is designed such that positioning plate 246 is not moved during the stage of the record-change cycle during which the tone arm is under the influence of the main slide. By the time the tone arm has been moved to its outermost position by the main slide, cam 256 has been so rotated that a low portion therein engages pin 254. This causes positioning plate 246 to pivot about pin 204 and move tab 248 against pin 252 to rotate tone arm plate 164 and tone arm shaft 118 to return tone arm 114 toward a position suitable for the playing of the next record.

It is evident that during this return motion of the tone arm, the tone arm is directly engaged only by a resiliently driven member (the spring biasing of positioning plate 246 against cam 256 by spring 249) so that obstruction of the tone arm travel causes positioning plate 246 to move against its spring bias and the changer is not damaged.

The mechanism for determining the tone arm position at the end of the inward rotation thereof includes the function cam 200. As can be seen in FIG. 14, cycle gear 150 contains a pin 150a which engages function cam 200 early in the cycle of the cycle gear to pivot the function cam about its pivot pin 201. This pivoting movement permits the function cam to respond to the vertical position of the balance arm shaft 124 so that if the last record has been played the function cam will go into the shutoff mode, as will be described. If the shutoff mode is not initiated by the balance arm shaft, the function cam will return via spring bias to the tone arm setdown position as determined by setdown cam 262. A pin 258 carried by function cam 200 is adapted to engage a selected one of a number of steps 260 carried by pivotable setdown cam 262. The given one of steps 260 which engages pin 258 is established by the position of cam 262 which in turn is determined by rotation of record size selector handle 130. The position of the function cam 200 as determined by the given one of steps 260 in turn determines which one of a plurality of stops 264 carried by function cam 200 will intercept tab 248 and bring to a halt the movement of positioning plate 246 as its tab 248 drives the tone arm toward the turntable. Accordingly, each of the stops 264 correspond to a predetermined position for setdown of the tone arm. Thus, the setting of record size selector handle 130 determines which of the stops 264 arrests inward motion of the tone arm to bring the tone arm to the desired position for record play.

During the movement of the tone arm, first outward by means of the main slide and the jam-resistant slide 241 contained thereon then inward by positioning plate 246, the clutch mechanism (tone arm plate 164, flange 162 and friction washer 166 compressed therebetween) is engaged. As has been mentioned, this clutch resists undesired lateral movement of the tone arm, so that when the position plate brings the tone arm to the setdown position, the clutch prevents the momentum of the tone arm from carrying it beyond this position.

Having been rotated into the position determined by the setting on the record size selector handle 130, the tone arm is subsequently lowered onto the record as the main slide resumes its original position and detent 158 is re-entered by lift pin 168. At this time, the clutch mechanism releases the tone arm for free lateral movement and free tracking in the record groove.

According to a principle object of the present invention, the tone arm positioning function is conducted through the use of elements asosciated with the function cam 200. Function cam 200 is also responsible for the automatic shutoff function of the record changer as described below. By integrating the tone arm positioning and automatic shutoff functions by means of common usage of the function cam 200, the record changer has been substantially simplified from prior art changers.

AUTOMATIC SHUTOFF

FIGS. 7 through 11 disclose the cooperation of the balance arm shaft 124 with other elements involved in the automatic shutoff function which is performed by the changer after the last record has been played. A tube 190 including an upper portion 190*a* and a lower portion 190*b* (FIG. 9), which is mounted upon baseplate 111 by means of a pair of shoulders 191*a* and 191*b* receives balance arm shaft 124. Shaft 124 is slideable and rotatable within tube 190, whereby the balance arm may be lifted and rotated from proximity to the spindle and the records held thereon to the tone arm rest position. In addition, when the balance arm is in position for retaining the plurality of records on the spindle, the arm and shaft will move downward incrementally by force of gravity as records are dropped from the spindle onto the turntable, since it is the records which hold the arm in an elevated position.

Pursuant to a major object of the present invention, the lower end of shaft 124 includes a first flat or recessed portion 194 extending axially lengthwise of the shaft, and a second full portion 196 which is not recessed but rather whose cross section extends radially beyond that of the recessed portion 194. Depending upon the vertical position of balance arm shaft 124 either portion 196 or portion 194 thereof cooperates with a slot 192 cut transversely of the axis of tube 190 near its lower extremity. It is to be noted that when the balance arm is in its upper position, shaft 124 presents recessed portion 194 to slot 192 to be exposed thereby for cooperation with other elements of the shutoff mechanism. When the balance drops to its lowermost position, full portion 196 is presented to slot 192.

A key element in the present invention is function cam 200 which is shown in FIGS. 2, 4, 8, 9 and 12. Function cam 200 performs portions of several automatic functions of the record changer of the present invention (including automatic shutoff and automatic tone arm positioning) and will be discussed in the contexts of these functions. Function cam 200 is pivotally mounted about pin 201 (shown in FIG. 2), which pin is affixed to baseplate 111. An arcuate slot 202 in function cam 200 receives a second pin 204 by which the pivoting of the function cam is guided and limited. The function cam is positioned and adapted to be engaged and pivoted by means of a pin **150*a* (see FIG. 14) carried by the cycle gear 150 during each revolution of the cycle gear. The movement of the function cam during each record change cycle includes a single oscillation along a defined path of pivot (defined by arcuate slot 202 and pin 204) between a first position (a selected one of tone arm setdown positions) shown in solid lines, and a second position shown in phantom lines in FIG. 8 For convenience, the first position can be denominated position C and the second position D. In operation, the function cam 200 pivots under the influence of the aforementioned pin on cycle gear 150** from position C to position D and back again (by means of spring bias) to position C during each record-change cycle.

An extension 206 of function cam 200 carries a protrusion 208, which protrusion normally resides within slot 192 of tube 190 (in position C), is pivoted out of the slot during motion from position C to position D, and re-enters the slot upon return motion to position C.

During a record-change cycle wherein at least one record remains on the spindle, protrusion 208 is free to move through slot 192 during oscillation between positions C and D since recessed portion 194 of balance arm shaft 124 is presented to slot 192.

During the record-change cycle involving the dropping of the last record from the spindle to the turntable, a sequence of events occurs as follows. Function cam 200 is engaged by pin **150*a* on cycle gear 150 and is moved from position C where protrusion 208 is within slot 192 to position D. Pin 150*a* passes beyond contact with function cam 200 and this spring biased function cam returns to position C. Cycle gear 150, continuing in its revolution, moves main slide 152 until tab 156 on main slide 152 engages the lower end of knife 157 in spindle 120 to eject the last record. With the drop of the last record, balance arm 122 will drop since no records remain to support it. Balance arm shaft 124 will fall until contact is made with protrusion 208 of function cam 200. Thus, before the play of the last record, all the elements of the changer mechanism are in the same position as they would be for the play of any other record with the exception of the balance arm which is restrained from its lowermost position by the function cam protrusion 208.**

After play of the last record, the cycle gear 150 is again activated by the velocity trip mechanism 280 to effectuate record change. Pin 150a of the cycle gear engages function cam 200 and moves it from position C to position D. Since protrusion 208 on the function cam is no longer in slot 192 of tube 190, balance arm shaft 124 is permitted to drop to the lowermost position. As the cycle gear moves on and the function cam would return to position C, the full portion 196 of balance arm shaft 125 is adjacent slot 192 and prevents protrusion 208 of the function cam from entering the slot so that the function cam is inhibited from returning to position C (the normal tone arm setdown position) and is held in the shutoff position intermediate positions C and D.

Figure 12:
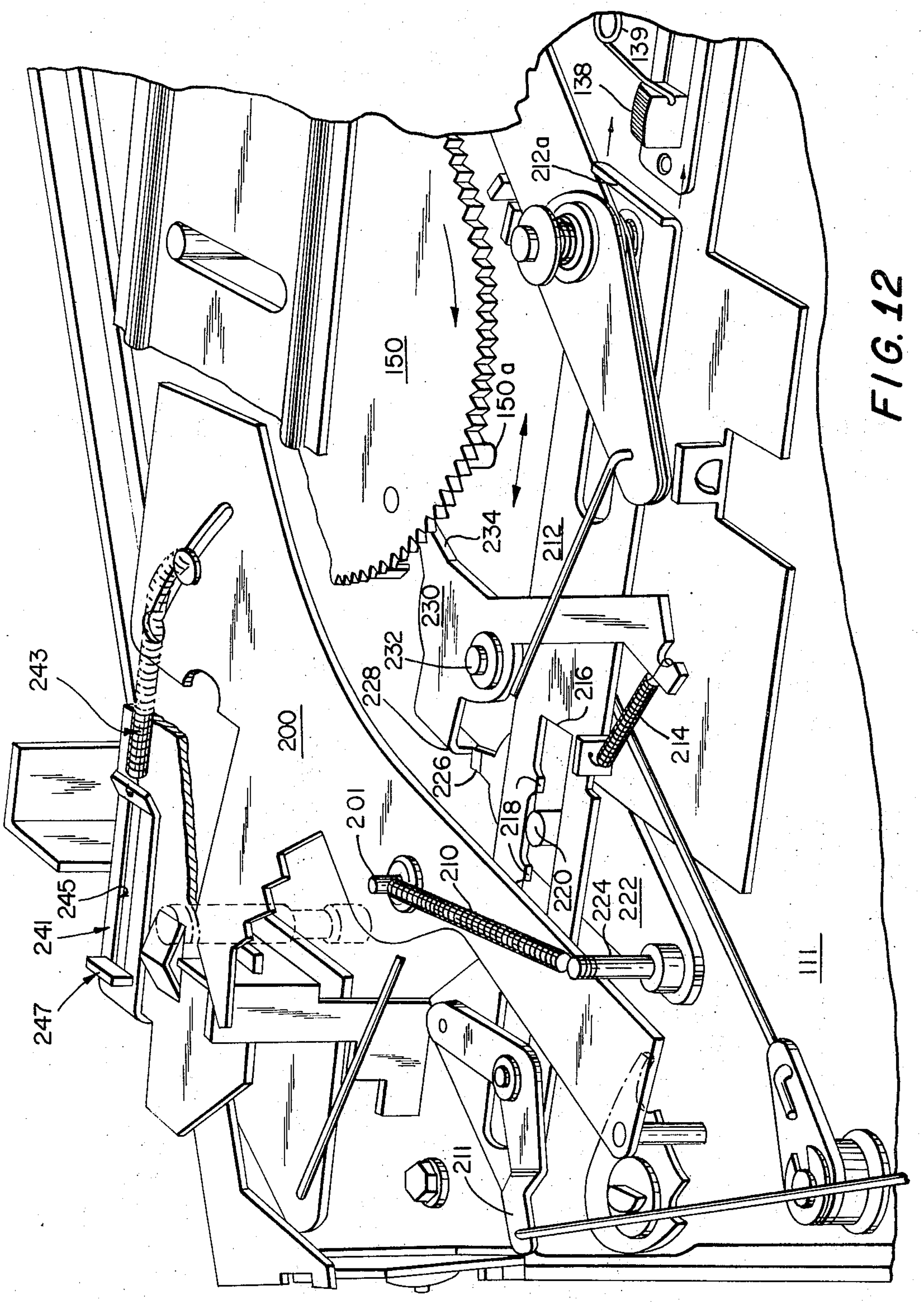
FIG. 12 is a partial perspective view of the record changer disclosing further elements related to the automatic shutoff function.

With function cam 200 in the shutoff position, certain elements including function slide 212 are uniquely affected. As shown in FIGS. 2 and 12, motor switch 138 is disposed in proximity to end 212a of function slide 212. Function slide 212 is adapted to be movable in the directions of the arrows shown in FIG. 12, and when in the righthand position engages switch 138 to de-energize the motor by moving the switch to the right against the bias of spring 139. A tension spring 214 biases function slide 212 to the right. The bias of spring 214 is greater than that supplied by spring 139 whereby if the function slide is free from other restraint it will move against and deenergize motor switch 138.

As shown in FIGS. 12 and 13, slide 212 has a slot 216 cut therein and teeth 218 projecting into the slot. A restraining pin 220 engages teeth 218 to restrain slide 212 against its spring bias. Restraining pin 220 is carried by a plate 222 slideably and pivotally positioned in proximity to function slide 212 by means of a pin affixed beneath plate 222 cooperating with a slot 223 in baseplate 111. With regard to automatic shutoff, the restraining pin 220 would be between teeth corresponding to either the "automatic play" position or the "manual play" position of the function slide 212, as described above. The cooperation of elements influencing the slide 212 is such that release of the slide by withdrawal of restraining pin 220 from engagement with teeth 218 will permit the slide to be moved under the influence of the spring 214 into contact with motor switch 138 to de-energize the motor.

As has been previously shown, during the record-change cycle after the last record has been played, the balance arm shaft 124 assumes a position wherein the pivoting of function cam 200 is brought to rest in a predetermined orientation. This orientation is that shown by FIG. 12. Tension spring 210 biases pin 224 which is carried by an end of plate 222 against an edge of function cam 200. Consequently, the orientation of function cam 200 about its pivot pin 201 determines the orientation of plate 222 about restraining pin 220. In the predetermined shutoff orientation shown in FIG. 12, plate 222 presents an end tab 226 to a depending tab 228 of release plate 230, pivotally mounted upon baseplate 111 about pivot pin 232. During each record-change cycle near the end of the cycle, pin 150*a* depending from cycle gear 150 engages an arm 234 carried by release plate 230 which arm underlies the cycle gear. This engagement causes release plate 230 to pivot about pin 232 and to move tab 228 toward slide 212. As a result, with the plate 222 oriented in the position shown, wherein end tab 226 is presented to depending tab 228, the two tabs cooperate and plate 222 is moved along slot 223 against the bias of spring 210. The motion of the plate 222 withdraws restraining pin 220 from engagement with teeth 218 allowing function slide 212 to be moved by means of spring 214 against switch 138 to deenergize the motor.

In the above manner the record changer of the present invention is automatically shut off. It may be seen that this only occurs when the end tab 226 of the slideable plate 222 is oriented to be engaged by depending tab 228 of release plate 230. This in turn only occurs when the function cam 200 which abuts pin 224 is disposed in the predetermined shutoff orientation by the inhibition supplied by the balance arm shaft 124 after the last record has been played.

ANother element of the record changer that is uniquely affected by function cam 200 when it is in the shutoff position is the tone arm 114. During the record change cycle after play of the last record the tone arm is lifted by main slide 152, moved outwardly to clear the turntable by tab 242 and moved inwardly by positioning plate 246 until stopped by function cam 200. With function cam 200 in the shutoff position, positioning plate 246 is stopped when the tone arm is over the rest post 121 (FIG. 1). When the main slide returns to its normal position with detent 158 under lift pin 168, the tone arm will be lowered onto the rest post. Since the rest post 121 is elevated considerably above the level of records on the turntable, the clutch mechanism 162, 164, 166 is engaged when the tone arm is on the rest post and will resist lateral mount of the tone arm preventing the tone arm from falling off of the rest post should the changer be jarred.

It can be seen from the foregoing that a primary feature of the present invention is achieved by the shutoff mechanism. As was stated at the outset of the specification, record changers incorporating automatic shutoff have in the past suffered from the undesirable feature of operation during play of the last record. The drop of the balance arm with the drop of the last record in changers of the prior art initiates the shutoff mechanism which continues to operate during play of the last record, often causing undesirable noises and movement. In contrast to this, the shutoff mechanism of the present changer stores the information that the balance arm has dropped and responds to its lowered position only after the last record has been played and the tone arm is disengaged from the record. Shutoff in the present changer thus is completed during the record change cycle.

CUEING

According to a principal object of the present invention, a cueing apparatus is provided for lifting the tone arm from contact with a record on the turntable, maintaining the tone arm in this lifted position so that the tone arm can be laterally manually moved, and replacing the tone arm onto the record at a new location or for returning the tone arm to the same location. The purpose of the cueing apparatus is to allow these manipulations without direct manual contact with the tone arm at the time the tone arm is engaged with a record, thereby avoiding possible damage to the stylus or record due to lateral motion during said engagement.

Figure 4:
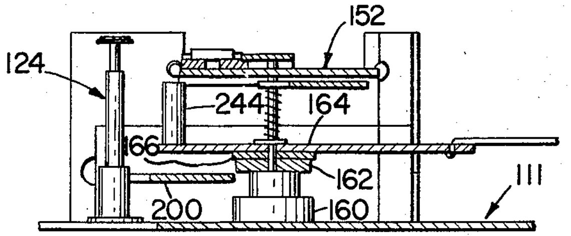
FIG. 4 is a section view taken along line 4—4 of FIG. 2.
Figure 5:
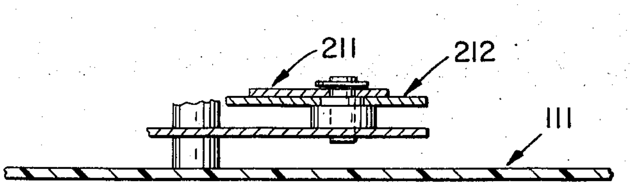
FIG. 5 is a section view taken along line 5—5 of FIG. 2.
Figure 6:
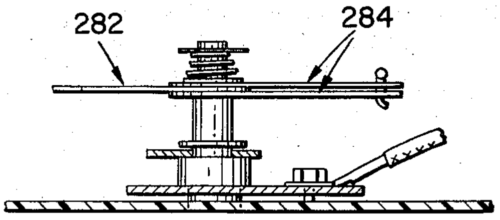
FIG. 6 is a section view taken along line 6—6 of FIG. 2.
Figures 7, 8, 9, 10, 11:
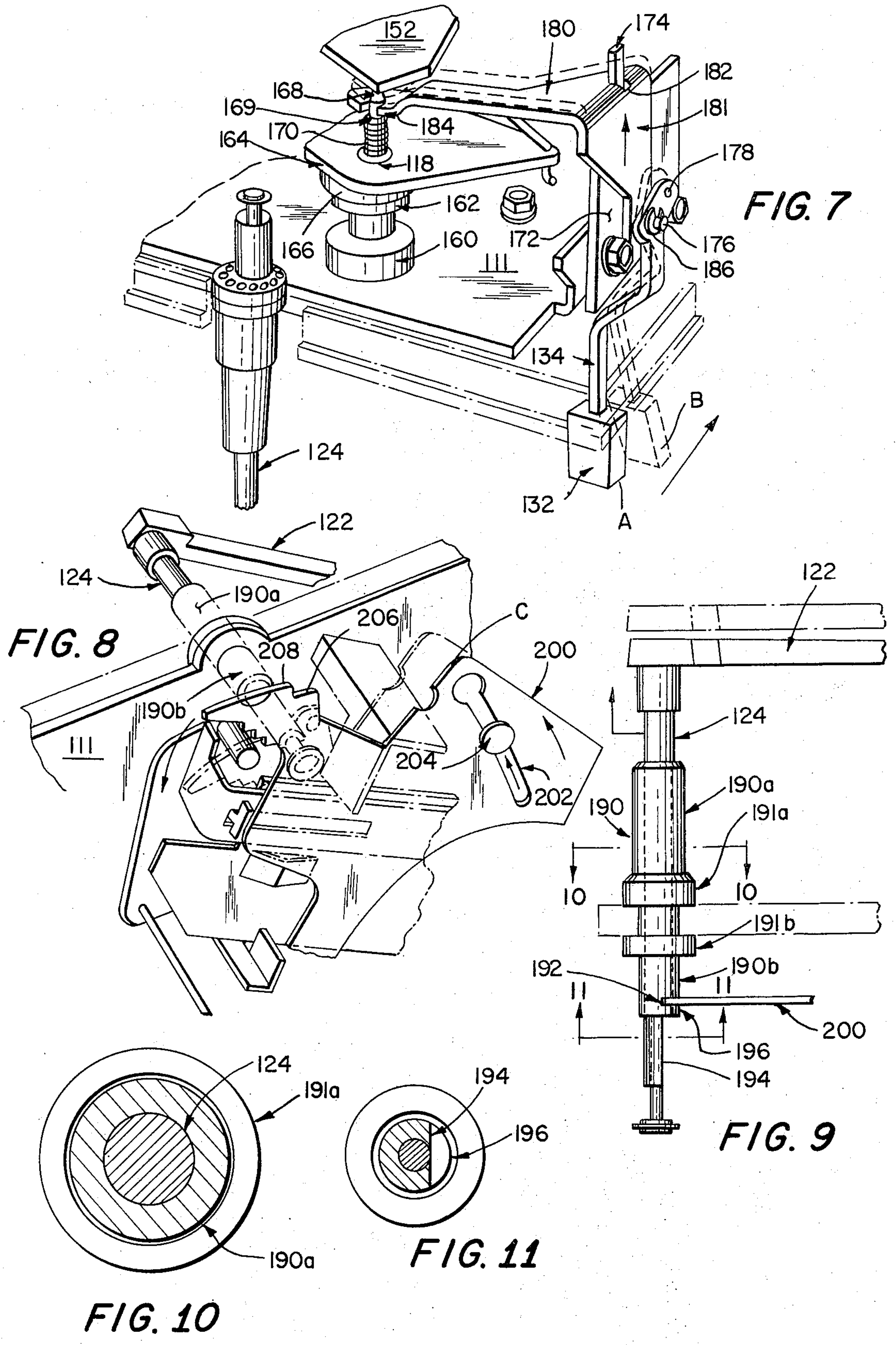
FIG. 7 is a perspective view of a portion of the record changer showing the cueing mechanism.
FIG. 8 is a perspective view of the record changer showing a portion of the elements related to the automatic shutoff function and depicting certain movements thereof.
FIG. 9 is an elevation of the same elements as shown in FIG. 8 showing other movements thereof.
FIG. 10 is a section view taken along line 10—10 of FIG. 9.
FIG. 11 is a section view taken along line 11—11 of FIG. 9.

FIGS. 4 and 7 show the portion of the record changer apparatus incorporating the essential elements of the cueing device and the associated clutch mechanism for resisting undesired lateral tone arm motion. A boss 160 affixed to baseplate 111 and projecting outward therefrom and incorporating a flange 162 encircles the rotatable tone arm shaft 118. Tone arm plate 164 is attached to the tone arm shaft 118 and is rotatable therewith. As described above there is disposed between the plate and flange a friction washer 166 formed in a generally annular shape of a suitable frictional material. The thickness of the friction washer is such that it is normally in contact only with the tone arm plate 164. As has been described, when the clutch is engaged, flange 162 and tone arm plate 164 are brought into proximity, and friction washer 166 is compressed therebetween to supply resistance to relative rotary motion between these two elements.

Cueing handle 132 is attached to one end of lever 134. This lever 134 is pivoted by means of a pin 176 in cooperation with a plate 172 depending from baseplate 111. Plate 172 provides a guide 174 corresponding to the direction of movement of the tone arm responsive to the desired cueing motion, herein disclosed as a straight vertical projection substantially perpendicular to the baseplate 111. An elevator mechanism including platform 180 and depending flange 181 cooperates with the second end of the lever 134 by means of a pinned junction to lever end 178 and with guide 174 by means of aperture 182. Owing to this configuration, platform 180 is moved in a direction perpendicular to the baseplate 111 and turntable along guide 174 responsive to the pivoting of lever 134 about pivot 176.

Platform 180 has an end 184 adapted to engage the lower end of a compression spring 170 and a shoulder 169 on tone arm lift pin 168 whereby actuation of the elevator means drives the lift pin and compression spring upward. Upon such upward movement, tone arm plate 164 is forced by spring 170 into proximity with flange 162, and friction washer 166 is compressed therebetween. Consequently, a rotary drag force is imparted between the plate and flange, whereby rotary motion of tone arm plate 164 and hence of the tone arm itself is inhibited.

In addition, upon the raising of the lift pin 168, the tone arm, which incorporates a portion adapted to abut the upper end (not shown) of lift pin 168, is engaged by the lift pin and the tone arm is raised from engagement with the record on the turntable. Having thus raised the tone arm, the elevator mechanism maintains the tone arm in this raised position in order that the operator may manually rotate the tone arm laterally about the tone arm shaft and thereby position it in any desired orientation relative to a record on the turntable. This maintenance of the raised position is achieved by means of a Belleville spring washer 186 at the pivot 176 which provides resistance to undesired motion of the lever 134.

The operation of the cueing mechanism is as follows. Handle 132 is movable between positions A and B as shown in FIG. 7. If the handle is in position B the tone arm is in engagement with a record on the turntable. In order to actuate the cueing mechanism to lift the tone arm, the handle is moved to position A. Lever 134 pivots about pivot 176 to rotate lever end 178 to the position shown in solid lines. Responsive to the motion of lever end 178, the elevator mechanism, including the platform 180, is raised and guided in the direction defined by guide 174 in cooperation with aperture 182 in the platform 180. Platform end 184 engages and lifts the lift pin 168 and compresses spring 170. The motion of the lift pin is transferred to the tone arm accomplishing the lifting of the tone arm. The compression of the spring 170 lifts rotatable tone arm plate 164 to compress the friction washer 166 between plate 164 and fixed flange 162. At this point, the tone arm has been lifted from the record surface, and is free to be moved laterally subject only to the frictional resistance to rotation supplied by the clutch. Rotation of the tone arm rotates tone arm plate 164 against the friction force exerted thereon by the friction washer 166. The desired lateral tone arm position having been reached (in the alternative, the tone arm may be returned to the same position), the operator releases the tone arm, the clutch maintaining this lateral tone arm position while the tone arm is returned to the record surface by return of handle 132 to point B. (It is to be noted that, in the interim, the handle 132 was maintained in a position A by means of the force of the Belleville spring 186 upon lever 134.) Lift pin 168 is lowered, and compression spring 170 is released by means of the lowering of platform end 184. Thus, the clutch is taken out of engagement, so that the tone arm having been replaced on the record is free to advance in the record groove.

The fact that the clutch mechanism is engaged and actuated upon the lifting of the tone arm and disengaged upon the lowering of the tone arm insures that, while undesired tone arm motion is effectively prevented, nevertheless the tone arm is free to move within the groove of a record upon engagement therewith.

CONCLUSION

In summary, there has been described a complete record changing mechanism. This record changing mechanism incorporates throughout parts capable of performing a plurality of functions so that the mechanism is less complex and less expensive than its predecessors. In particular, the function cam is instrumental in positioning the tone arm for set down on the record and also to communicate the intelligence that the last record has dropped, only after play of this record, to the shutoff mechanism. The function slide arranges the various elements of the changer mechanism for four different modes of operation ("off," "manual," "automatic" and "reject") both by initiating operating and inhibiting operation. Also, the cycle gear is provided with increased responsibility over changers of the prior art, here controlling all phases of record changing, play and shutoff.

While there has been illustrated and described a preferred embodiment of the present invention, it will be apparent that various changes and modifications thereof will occur to those skilled in the art. It is intended that the appended claims cover all such changes and modifications as fall within the true spirit and scope of the present invention.

What is claimed as new and desired to be secured by Letters Patent of the United States is:

1. An automatic record changer for playing a plurality of records seriatim, comprising:

a base plate, a turntable rotatably mounted on said base plate for supporting records for play thereof, a motor for driving said turntable, a spindle mounted on said base plate to support said records prior to play, a balance arm for balancing the records supported by said spindle, said balance arm having a shaft slidably mounted on said base plate, a tone arm having a shaft pivotally supporting said tone arm on said base plate to permit lateral and perpendicular movement of said tone arm with respect to said base plate, slide means mounted for slidable movement between a plurality of positions including an off position to select the different modes of operation of said record changer, first bias means for biasing said slide means for said slidable movement, restraining means coupled to said base plate and cooperating with said slide means to releasably maintain said slide means in selected ones of said positions, said slide means containing receiving means to cooperate with said restraining means in each selected position to cooperate in maintaining said slide means in said position, mode control means movably mounted on said base plate so as to be externally accessible and coupled to said slide means for providing manual control of the position of said slide means, and release means for engaging said restraining means so as to force it out of cooperation with said receiving means for providing automatic movement of said slide means under influence of said first bias means.

2. An automatic record changer as recited in claim 1 further including second bias means for biasing said restraining means into engagement with said receiving means, wherein either the movement of said mode control means to select a different mode of operation for said record changer or the operation of said release means act to overcome said second bias means to disengage said restraining means from said receiving means.

3. An automatic record changer as recited in claim 2 wherein said receiving means comprises a notched slot in said slide means and said restraining means includes a pin, said second bias means biasing said pin into engagement with one of the notches to establish a position for said slide means.

4. An automatic record changer as recited in claim 2 further including switch means for applying electrical power to energize said motor, said switch means being engaged by said slide means when said slide means is in the off position to de-energize said motor.

5. An automatic record changer as recited in claim 4 further including a cycle gear rotatably mounted on said base plate, a pinion mounted for rotation with said turntable, and velocity trip means responsive to the tracking of a record by said tone arm to initiate engagement of said cycle gear with the pinion when the tone arm is in the leadout groove of the record being played for operation of the record change cycle of the record changer, said slide means having inhibit means to engage said velocity trip means to prevent initiation of said record change cycle when said slide means is in the off position.

6. An automatic record changer as recited in claim 5 wherein one of the positions of slide means is a manual play position, said inhibit means engaging said velocity trip means to prevent initiation of the record change cycle when said slide means is in the manual play position.

7. An automatic record changer as recited in claim 5 wherein one of the positions of said slide means is a reject position, said slide means having means to initiate engagement of said cycle gear with the pinion to cause initiation of said record change cycle when said slide means is in the reject position.

8. An automatic record changer as recited in claim 1, further including automatic record change means responsive to the end of play of a record to lift and laterally move said tone arm free of said turntable and to eject the lowermost record on said spindle to said turntable, tone arm set down means determining the set down position of the tone arm in accordance with the size of the records to be played, tone arm positioning means responsive to said automatic record change means to move said tone arm laterally inward until stopped by said tone arm set down means, said tone arm thereby being in position for set down to play the record on the turntable.

9. An automatic record changer as recited in claim 8 wherein said tone arm set down means includes a function cam pivotally secured to said base plate and positionable between tone arm set down determining positions and a secondary position, and set down control means movably mounted on said base plate so as to be externally accessible and coupled to said function cam to select the set down determining position of said function cam in accordance with the size of the records to be played.

10. An automatic record changer as recited in claim 9 wherein the shaft of said tone arm has position responsive means secured thereto, said position responsive means being responsive to the lateral position of said tone arm by turning with the tone arm shaft, and wherein said tone arm is laterally moved clear of said turntable by movement of said position responsive means by said automatic record change means, said position responsive means being engaged by said tone arm positioning means to laterally move said tone arm inward to the set down position.

11. An automatic record changer as recited in claim 10 wherein said position responsive means is engaged by said tone arm positioning means subsequent to disengagement of said position responsive means by the means for moving said tone arm clear of said turntable.

12. An automatic record changer as recited in claim 10 further including clutch means mounted for operative relationship to said position responsive means, the lifting of said tone arm causing engagement of said clutch means with said position responsive to resist lateral movement of said tone arm, said clutch means preventing the tone arm from moving beyond said set down position when said positioning means engages said function cam.

13. An automatic record changer as recited in claim 9 wherein said function cam intersects the vertical path of travel of said balance arm shaft when in said set down determining positions to inhibit fall of the balance arm shaft to its lowermost position upon drop of the last record from said spindle, said function cam being moved from said set down determining positions to said secondary position by said automatic record change means during each record change cycle such that said balance arm shaft is permitted to fall to its lowermost position after play of the last record, said balance arm shaft when in its lowermost position inhibiting return of the function cam to a set down determining position and holding said function cam in a shutoff position to initiate shutoff of said record changer.

14. An automatic record changer as recited in claim 13 further including switch means for applying electrical power to energize said motor, said switch means being engaged by said slide means when said slide means is in the off position to de-energize said motor, and wherein said function cam orients said restraining means in a shutoff orientation when said function cam is in said shutoff position such that said restraining means is movable from the receiving means of said slide means permitting said slide means to move to the off position.

15. An automatic record changer as recited in claim 14 further including release means engaged by said automatic record change means to move said restraining means from said receiving means when said restraining means is in the shutoff orientation.

16. An automatic record changer as recited in claim 15 wherein said positioning means is also stopped by said function cam when the function cam is in the shutoff position, whereby said tone arm is positioned for set down in a rest position clear of said turntable.

17. An automatic record changer for playing a plurality of records seriatim, comprising:

a base plate, a turntable rotatably mounted on said base plate for supporting records for play thereof, a motor for driving said turntable, a spindle mounted on said base plate to support said records prior to play, a tone arm having a shaft pivotally supporting said tone arm on the base plate to permit lateral and perpendicular movement of said tone arm with respect to said base plate, said tone arm shaft being hollow and containing a lift pin slidably mounted therein, automatic record change means responsive to the end of play of a record to lift and laterally move said tone arm free of said turntable and to eject the lowermost record on said spindle to said turntable, said lift pin being engaged by said automatic record change means to lift said tone arm during the record change cycle, tone arm set down means determining the set down position of the tone arm in accordance with the size of the records to be played, tone arm positioning means responsive to said automatic record change means to move said tone arm laterally inward until stopped by said tone arm set down means, said tone arm thereby being in position for set down to play the record on the turntable, clutch means in operative relationship to the shaft of said tone arm, and cueing means mounted for external access and coupled to said tone arm for lifting said tone arm from the record being played, permitting manual positioning of said tone arm, and for returning said tone arm to said record, said lift pin being engaged by said cueing means during play of the record to lift the tone arm when cueing is desired, said clutch means being engaged upon movement of said lift pin to raise the tone arm and disengaged upon movement of said lift pin to lower the tone arm to prevent undesired lateral movement of said tone arm beyond the set down position and during cueing.

18. An automatic record changer comprising:

a base plate, a turntable rotatably mounted on said base plate for supporting records for play thereof, a motor for driving said turntable, a spindle mounted on said base plate to support said records prior to play, a balance arm for balancing the records supported by said spindle, said balance arm having a shaft slidably mounted on said base plate, and shutoff means responsive to the vertical position of said balance arm shaft upon dropping of the last record to inhibit fall of said balance arm until said last record has been played, said shutoff means releasing said balance arm shaft after play of said last record and being positioned by the fall of said balance arm shaft to initiate shutoff of said record changer.

19. An automatic record changer as recited in claim 18 wherein said shutoff means includes control means positionable between shutoff-inhibiting and shutoff-enabling positions, said control means containing a portion intersecting the vertical line of travel of said balance arm shaft when said control means is in a shutoff-inhibiting fall of said balance arm shaft to its lowermost position upon drop of the last record to the turntable, means for moving said control means to the shutoff-enabling position after the play of each record to cause the portion of said control means to move from said line of travel permitting fall of said balance arm shaft to its lowermost position after play of said last record, said balance arm shaft in its lowermost position preventing return of said control means to a shutoff-inhibiting position and thereby positioning said control means for initiating shutoff of said record changer.

20. An automatic record changer as recited in claim 19 wherein said control means is a function cam pivotally secured to said base plate and positionable between tone arm set down determining positions and a secondary position, the tone arm set down determining positions comprising shutoff-inhibiting positions and the secondary position comprising said shutoff-enabling position, and further including a cycle gear rotatably mounted to said base plate, cycle gear drive means engageable with said cycle gear to drive said cycle gear to occasion a record change cycle of the record changer, and means responsive to movement of said cycle gear to eject a record from said spindle during each record change cycle, said means for moving said control means comprising said cycle gear moving said function cam from a shutoff-inhibiting position to the shutoff-enabling position and bias means moving said function cam back to the shutoff-inhibiting position during each record change cycle before the ejection of a record from said spindle.

21. An automatic record changer as recited in claim 20 further including slide means mounted for slidable movement between a plurality of positions to select the different modes of operation of said record changer, restraining means coupled to said base plate and cooperating with said slide means to releasably maintain said slide means in selected ones of said positions, switch means for applying electrical power to energize said motor, said switch means being engaged by said slide means when said slide means is in the off position to de-energize said motor, said restraining means being oriented by said function cam in shutoff orientation when said function cam is held in the shutoff position by said balance arm shaft, such that said restraining means is movable from the receiving means of said slide means permitting said slide means to move to the off position.

22. An automatic record changer as recited in claim 21 further including release means engaged by said cycle gear to move said restraining means from said receiving means when said restraining means is in shutoff orientation.

* * * * *